Patented Apr. 26, 1949

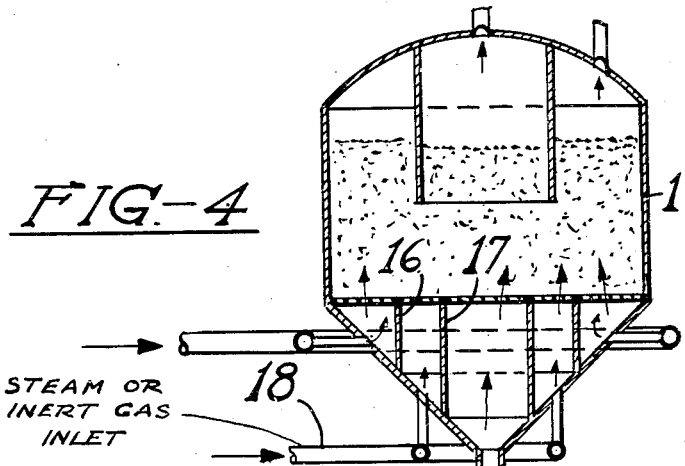
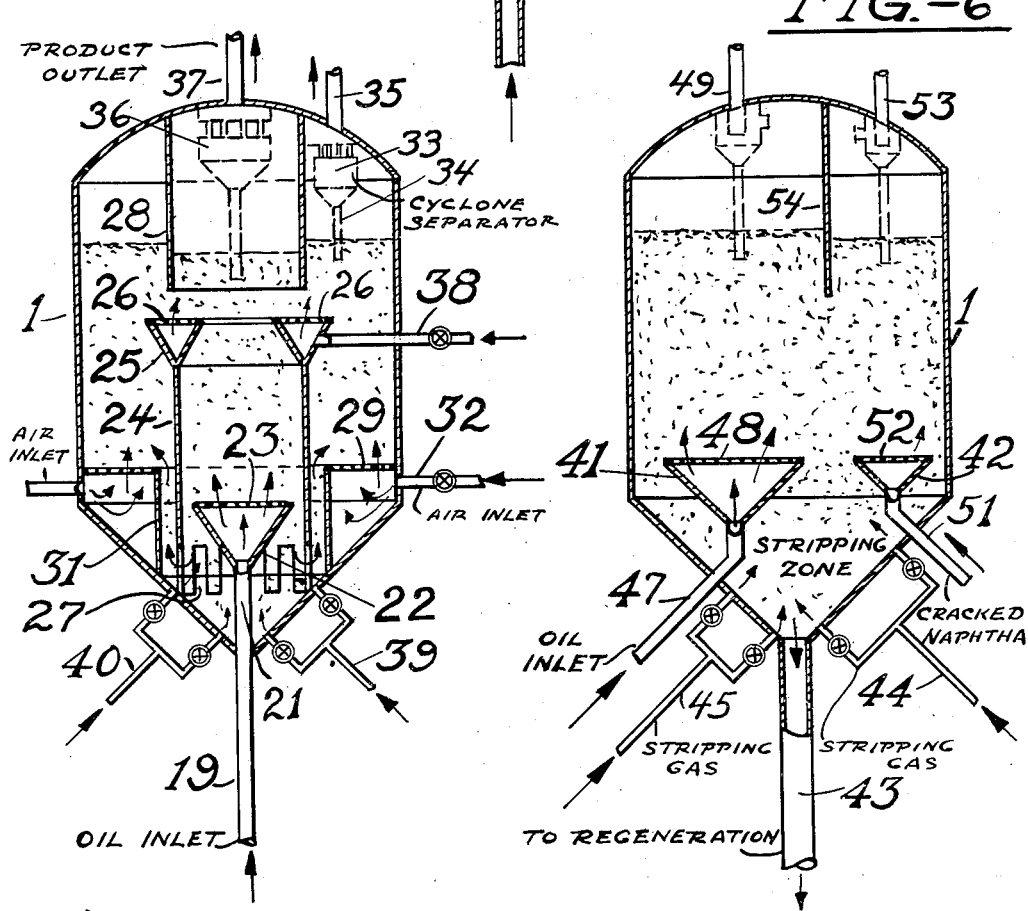

2,468,508

UNITED STATES PATENT OFFICE 2,468,508

CONVERSION PROCESSES IN THE PRESENCE OF A DENSE TURBULENT BODY OF FINELY DIVIDED SOLID MATERIAL

John C. Munday, Cranford, N. J., assignor to Standard Oil Development Company, a corporation of Delaware Application February 20, 1945, Serial No. 578,887

11 Claims. (Cl. 196—52)

This invention relates to a method of and apparatus for treating two or more streams of gas with a powder. The powder may serve as a catalyst for effecting a reaction between one or more of said gas streams, or it may be acted upon by one or more of said streams. In other cases the powder may serve merely to add heat to or extract heat from one or more of the reactions.

The invention offers advantages in processes in which one main gaseous reaction is carried out in the presence of a powder and in which either the powder or a secondary stream of gas is subjected to a complementary treatment or reaction. One example of the type of process in which the invention finds particular application is in reactions involving hydrocarbons and in which the powder serves as a catalyst and the catalyst must be maintained in an active state by reactivation or regeneration. Another type of process in which the invention finds application is in oxidizing, reducing and chlorinating reactions in which the powder supplies the oxygen, chlorine, hydrogen, and the like. In this type of process the secondary stream of gas may serve to replenish the oxygen, hydrogen and chlorine utilized in the main reaction. The invention also finds use in processes in which a secondary stream of gas is used to add heat to or extract heat from a main reaction.

One of the principal objects of the invention is to provide a more simple and economic method of and apparatus for carrying out reactions of the above type.

In accordance with the present invention, two separate streams of gas are passed upwardly through different vertical sections of an enlarged vertical reaction vessel containing finely-divided powder at a velocity controlled to maintain a relatively dense, highly turbulent layer of powder within the vessel. It has been found that when operating in this manner the gases or vapors pass upwardly through the vessel in a vertical path with little, if any, transverse flow throughout the vessel, even though the powder within the vessel is in a highly turbulent state and tends to circulate through the full cross-sectional area of the vessel.

The present invention takes advantage of this phenomenon by passing one stream of gas upwardly through one vertical section of the reaction vessel and a second stream or gas upwardly through another vertical section so that at least two separate reactions or treatments can be carried out simultaneously in the same vessel. When operating in this manner, the separate streams of reactant gases tend to maintain their identity except for some intermingling of the streams at their border. According to one specific phase of the invention, the intermingling of the two streams at their border is reduced or prevented by passing a third stream of relatively inert gas upwardly through the border zone and dividing the two main reactant streams. This inert gas tends to serve as a blanket or shield, preventing transverse intermingling of the two gas streams while permitting the powder to circulate freely within the vessel.

In accordance with another phase of the invention, the separate gaseous products after passing through the bed of powder are separately collected by providing a vertical partition depending from the top of the reaction vessel below the top level of the layer of fluidized, turbulent solids therein so that one stream of gas may be collected on one side of the partition and a second stream of gas may be collected on the opposite side, while at the same time permitting free circulation of the powder in the bottom section of the vessel.

The apparatus phases of the invention may take several forms, some of the preferred forms being illustrated in the accompanying drawings.

Referring to the drawings,

Fig. 4 is a vertical section of a reaction vessel showing another modification of the invention;

Fig. 5 is also a vertical section of a reaction vessel showing another modification; and Fig. 6 is a vertical section of a reaction vessel showing still another modification.

Various other objects and advantages of the invention will become apparent from the more detailed description in which reference will be made to the accompanying drawings.

Figure 1:
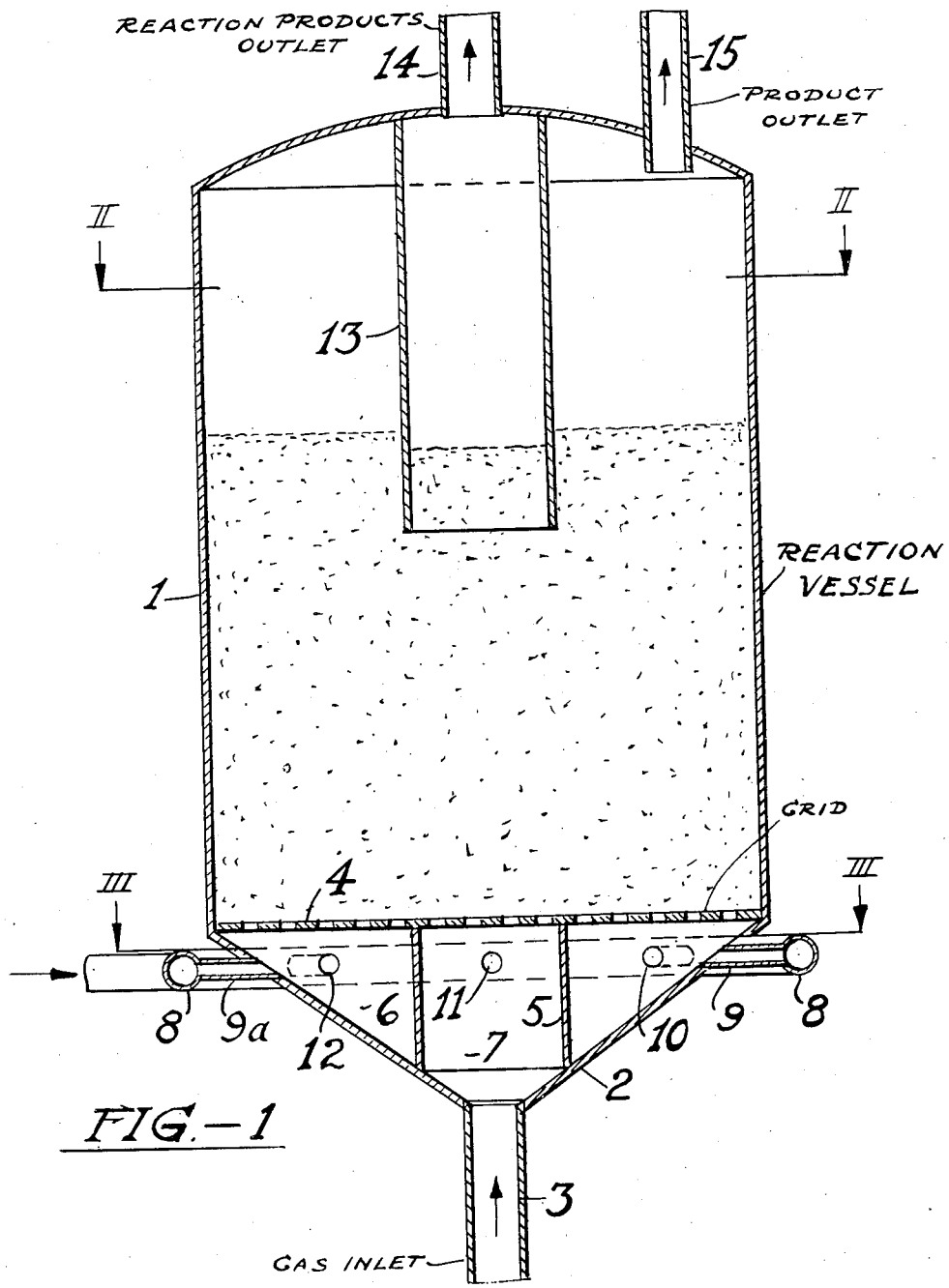
Fig. 1 is a vertical section of a reaction vessel and connecting lines forming one embodiment of the invention.

Referring to Fig. 1, the reference character 1 designates the outer shell of an enlarged vertical reaction vessel. In cases where the reactions are to be carried out at high temperatures, this shell may be insulated either internally or externally by suitable refractory material (not shown). The bottom section of the vessel is preferably in the form of an inverted cone 2 terminating at an apex into a conduit 3 through which one stream of gas to be reacted may be introduced. Positioned above the conical section of the vessel 1 is a perforated grid 4 through which the gases to be reacted pass into the main body of the reactor. Below the perforated grid 4 is an annular partition 5 having its upper end connected to the bottom of the perforated grid 4 and the lower end connected to the conical bottom 2 of the vessel. This partition 5 divides the conical bottom of said vessel into an outer annular space 6 and a central space 7. A second stream of gas may be introduced into the outer annular space 6 by means of a bustle pipe 8 having connecting tubes 9, 10, 11, 12 and 9a communicating with the interior of the annular space 6. The gas introduced into the annular space through the connecting conduits passes upwardly through the perforated grid positioned immediately above into the outer annular portion of the reaction vessel. A second annular partition 13 is positioned in the upper portion of the reaction vessel and has its upper end rigidly secured to the top of the reaction vessel.

The vessel 1 is adapted to contain a body of finely-divided solids in the form of a fine powder and the velocity of the gases passing upwardly through the vessel is preferably controlled to maintain the powder in a relatively dense, turbulent state in the bottom portion of the vessel. The partition plate 13 extending downwardly from the top of the vessel should terminate below the level of the powder therein. The central space formed by the partition 13 communicates with a conduit 14 for withdrawing reaction products from the vessel, and the annular space surrounding the annular partition 13 also communicates with a second conduit 15 for withdrawing products passing upwardly around the outer portion of the reaction vessel.

During operation one stream of gas, which may or may not contain finely-divided powder, is introduced into the bottom portion of the vessel 1 through conduit 3 and discharges through the central perforations into the main body of the reactor. The vapors or gaseous products passing upwardly through the central section of the vessel collect in the central zone confined by the partition 13 and are withdrawn from the reaction vessel through conduit 14. A second stream of gas, which may or may not contain powder, discharges upwardly through the perforations around the outer portion of the vessel and the reaction products are collected in the annular zone in the upper section of the reaction vessel and are withdrawn through conduit 15. The construction above described permits two separate or complementary gas reactions to be carried out in a single vessel in the presence of a layer of powder which may circulate freely throughout the full cross-sectional area of the vessel.

Fig. 4 illustrates a second modification in which a stream of inert gas is passed upwardly between the outer annular zone and the central zone to reduce or prevent intermingling of the two gas streams passing through the vessel. In the modification illustrated in Fig. 4, two annular partitions 16 and 17 are positioned in the bottom conical section of the reactor which divide the bottom of the vessel into three distinct zones through which separate streams of gas are introduced into the vessel. The intermediate zone surrounding the central zone serves to distribute an inert gas which is introduced therein through conduit 18. This stream of gas passes upwardly through an intermediate annular section of the reaction vessel and serves to shield or blanket the gases passing upwardly through the outer annular section of the vessel and the gases passing upwardly through the central section.

Figure 2:
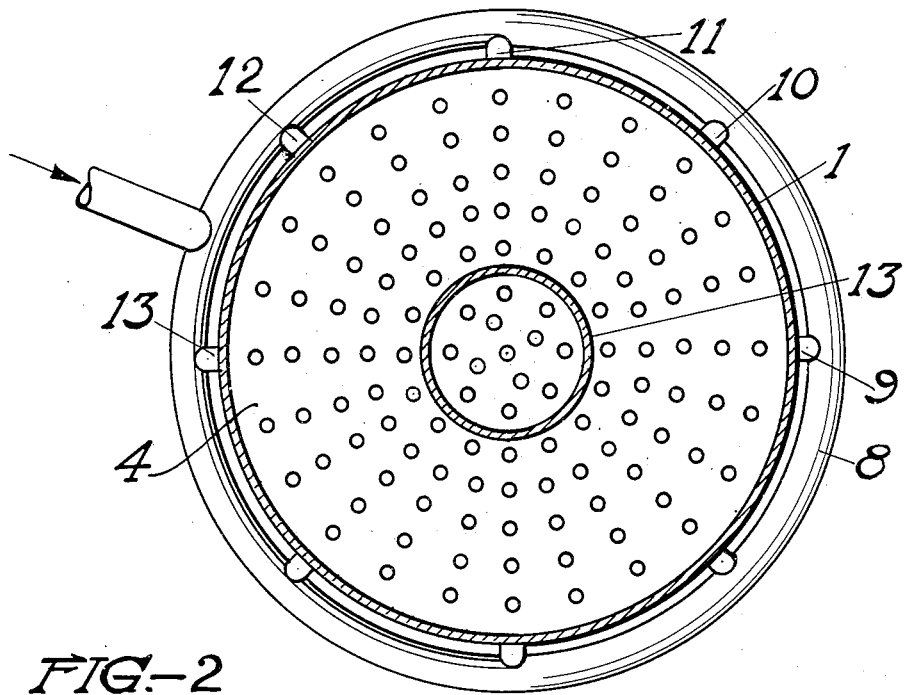
Fig. 2 is a horizontal section taken on line II—II of Fig. 1 across the full cross-sectional area of the vessel.
Figure 3:
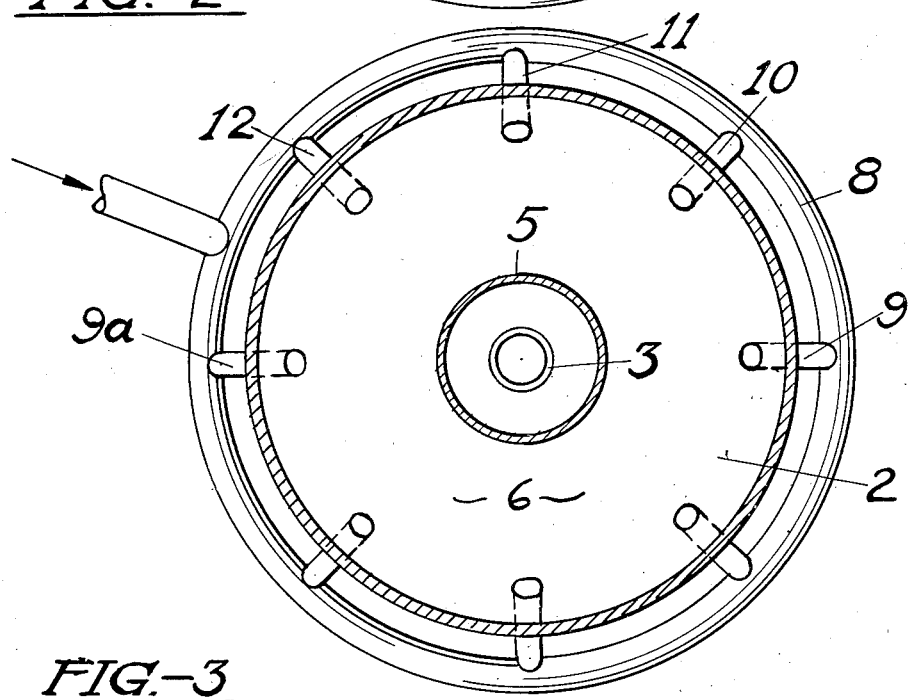
Fig. 3 is a second horizontal section taken on line III—III of Fig. 1.

In other respects the vessel illustrated in Fig. 4 is similar to that illustrated in Figs. 1, 2 and 3.

Fig. 5 illustrates a type of apparatus particularly adaptable for the catalytic cracking of hydrocarbon oils in which both the cracking and regeneration of the catalyst may be carried out in a single reaction vessel.

Referring to this figure, the oil to be cracked, either in liquid or vapor form, is introduced into the vessel through a central conduit 19 having an extension 21 projecting upwardly into the vessel and terminating into a cone 22 having a perforated grid 23 for dispersing the oil to be cracked into the central section of the vessel.

Surrounding the cone 23 and in spaced relation therewith is a vertical annular partition 24 having its upper end terminating in a V-shaped annular trough 25 having a perforated grid 26 at the top thereof. The annular partition wall 24 is supported in the bottom of the reaction vessel by means of suitable posts (not shown) or the partition wall may be supported at the base of the reaction vessel with cut-away portions 27 at the bottom thereof providing open communication between the outer annular section and the inner section of the reaction vessel. The vessel is also provided with a depending annular baffle 28 at the top of the vessel similar to the vessels illustrated in Figs. 1 to 4, inclusive, and this wall terminates below the level of the powder contained in the vessel but above the annular grid 26 so as to permit open communication between the inner and outer sections of the vessel, as illustrated.

The bottom portion of the vessel is also provided with an annular grid 29 having its outer periphery secured to the outer shell of the vessel and the inner periphery connected to a depending skirt 31 projecting downwardly to the bottom of the vessel, as illustrated. The annular skirt 31 is spaced from the vertical baffle 24 previously described to form a space through which powder may be transferred between the central zone and the outer zone of the reaction vessel.

The space confined by the grid 29, the bottom wall of the vessel and skirt 31 serves as a distributing zone into which a stream of regenerating gas such as air is introduced through line 32. The regenerating gas introduced through line 32 passes upwardly through the grid 29 around the outer annular zone of the vessel and the spent regeneration gas is collected in the upper annular space surrounding the depending partition 28 and is passed to a cyclone separator 33 or other suitable device for removing entrained powder. The powder removed from the gas is returned to the reaction vessel through pipe 34 which terminates below the level of the powder.

The spent regeneration gas after passing through the cyclone 33 is removed from the regeneration zone through line 35 and may be passed to other separating devices, such as Cottrell precipitators, scrubbers, or the like, which, in the interest of simplicity, have not been illustrated.

The vaporous products resulting from cracking the oil in the central section of the vessel are collected in the central zone at the top of the vessel and after passing through a cyclone separator 36 may be withdrawn through line 37. These products may be passed to suitable fractionating equipment (not shown) for segregating the desired product. During the cracking operation, coke or other combustible deposits tend to form on the catalyst which reduces its activity. As illustrated, the catalyst powder is permitted to circulate freely between the outer annular zone formed by the partition plates 24 and 28, respectively, and the central zone so that regeneration of the powder can be carried out in the outer zone and the cracking reaction carried out in the inner zone.

A stream of inert stripping gas may be introduced into the annular trough 25 formed at the top of the partition 24 through line 38. This stripping gas passes upwardly through the perforated grid 26 and serves as a shield or blanket, preventing intermingling of the oil vapors undergoing reaction and the regeneration gas.

The catalyst circulates between the outer regenerating zone and the inner cracking zone through the annular opening between the ends of the partition walls 24 and 28 and through the annular space formed between the partitions 24 and 31 in the bottom portion of the reaction chamber. A stripping gas, such as inert combustion gas, steam or the like, may be introduced into the extreme bottom of the reaction vessel at one or more spaced points through lines 39 and 40 which serves to strip the catalyst passing from the cracking zone into the regenerating zone.

The catalyst levels in the central zone and in the annular zone depend on the relative pressures in the gas phases above the levels. The powder seal around baffle 28 is maintained by withdrawing cracked vapors and regeneration gases at the proper rates through lines 37 and 35.

The direction of flow of the catalyst between the zones can be regulated by the relative volumes of vapors and gases passing upwardly through the regeneration zone and the cracking zone. In general, it is preferred to pass a smaller volume of oil vapors per unit volume of space in the cracking zone than the volume of regeneration gas per unit volume of space in the regenerating zone. This will make the density of the powder in the central cracking zone greater than the density in the regeneration zone and thus cause the catalyst to flow in the direction shown by the arrows in Fig. 5. The diameter of the annular baffles or partition walls 24 and 28 will determine the relative amount of space within the reaction vessel which is utilized for cracking and regeneration, respectively. In general, it is desirable to provide a greater space for effecting the regeneration than is utilized for the cracking operation, since greater volumes of gas and longer contact times are normally required for removing the combustible deposits from the catalyst than are required for carrying out the cracking operation.

While I have disclosed the cracking of oils in the center zone and regeneration in the outer zone, the operation may be carried out in the reverse manner in which the oil is cracked in the outer zone and the catalyst powder regenerated in the inner zone.

Although the design illustrated in Fig. 5 has been described with particular reference to the catalytic cracking of hydrocarbon oils, it may be used for other types of reactions, such as later described.

The design illustrated in Fig. 6 is somewhat similar to that shown in Figs. 1 to 4, inclusive, except that the gases are introduced into the reaction zone through cone-type distributing nozzles 41 and 42, and a conduit 43 leading from the bottom portion of the reaction vessel is utilized for withdrawing the catalyst from the vessel. A stripping gas may be introduced into the bottom section of the vessel through lines 44 and 45 for removing absorbed gases from the catalyst before withdrawing the same from the vessel. The reaction vessel illustrated in Fig. 6 finds particular application in the cracking of higher boiling hydrocarbons to form gasoline followed by the subsequent further treatment of the cracked naphtha or gasoline to remove olefinic constituents therefrom and improve the quality. When operating the vessel illustrated in Fig. 6, a mixture of oil vapors and catalyst discharges through line 47 into the distributing cone 41 from whence it passes through a perforated grid 48 into the main body of the reaction vessel. The velocity of the oil vapors passing upwardly through the vessel is controlled so that the catalyst separates into a relatively dense layer therein. The catalyst employed in this operation may be any suitable cracking catalyst, such as silica-alumina, silica-zirconia, silica-magnesia, boria-alumina, activated clays, etc. These catalysts would normally have an apparent density between 0.4 and 0.8. When employing a catalyst having particle sizes ranging from 0 to 100 microns, the superficial velocity of the vapors rising through the reaction vessel will be of the order of 0.5 to 3.0 feet per second, and preferably between 1 and 2 feet per second. Under these conditions a relatively dense layer of highly turbulent catalyst will be maintained within the reaction vessel having a density between 10 and 25 pounds per cubic foot.

The cracked vapors together with a small amount of entrained catalyst are removed overhead from the vessel through line 49 and may be passed through a cyclone or other suitable device for removing entrained catalyst. The vapors may then pass to the usual fractionating equipment for fractionally separating the naphtha or gasoline therefrom. The naphtha so separated may then be treated further by passing through line 51 into the distributing cone 42 from whence it passes through a perforated grid 52 into the righthand portion of the reaction vessel. The velocity of the gasoline vapors rising through this section of the vessel is also controlled so as to permit a relatively dense, fluid mass of catalyst to be maintained in this portion of the vessel. The naptha after being subjected to further treatment in the reaction vessel is subsequently removed through line 53 and subjected to further fractionation and purification. It is of course necessary to withdraw the cracked oil vapors and the treated naphtha vapors at the same rate as they are formed, and at substantially the same pressure, in order to prevent one or the other stream from bubbling beneath baffle 54.

As previously described, the present invention makes it possible to treat two separate and independent streams of gas with the same layer of finely-divided solid material and, furthermore, to withdraw the products as separate streams.

The invention finds application, for example, in any gaseous reactions involving substantial heat effects. In these cases, the heat may be added to or extracted from the powder by one of the gas streams while the second gas stream is undergoing reaction. The invention finds particular application, for example, in synthesis of hydrocarbons from carbon monoxide and hydrogen and in the polymerization of hydrocarbons. Both of these reactions are exothermic and it is necessary to cool the reaction zone. This can be accomplished by passing a cooling gas as one of the streams through the vessel or by injecting a vaporizable liquid, for example, water, thereto.

The invention also finds particular application in hydroforming or dehydrogenation of hydrocarbons in which the catalyst is reactivated by hydrogen. In this process, the main reaction can be carried out in one section of the reaction vessel and the activation of the catalyst with hydrogen can be carried out in another portion. The invention may also be used in the dehydrogenation of butene to form butadiene in which the dehydrogenation is accomplished in one section of the vessel and the treatment of the catalyst with steam is carried out in another portion.

As previously mentioned, Fig. 6 finds particular application in the cracking of hydrocarbon oils followed by retreating of the naphtha formed during the cracking operation, and Fig. 5 finds particular application in the catalytic cracking of hydrocarbon oils in which the cracking is carried out in one portion of the vessel simultaneously with regeneration in another portion of the vessel.

The invention also can be used for isomerizing reactions carried out in the presence of aluminum chloride supported on an absorptive powder. In these operations, catalyst activity can be maintained by treating the catalyst with chlorine and this can be accomplished simultaneously with the isomerizing reaction.

The invention may also be employed for effecting chlorination or oxidation in which the chlorination or oxidation is carried out in one section of the vessel and the oxygen or chlorine is supplied to another section of the vessel. In this case the powder may be an absorptive material which acts as a carrier for chlorine or oxygen gas, or it may be a compound of chlorine or oxygen such as those of polyvalent metals. The presence of large amounts of powder as employed in the present invention contributes greatly to the thermal stability of such reactions and facilitates temperature control by heat exchange devices.

Having described the preferred embodiment of the invention, it will be understood that it embraces such other variations and modifications as come within the spirit and scope thereof.

What is desired to be protected by Letters Patent is:

1. A process for carrying out gaseous reactions wherein a powder is alternately contacted with a plurality of gas streams which comprises passing one stream of gas upwardly through one vertical section of an enlarged vertical reaction zone containing a powder at a velocity regulated to maintain a relatively dense, turbulent body of said powder in the bottom portion of said zone, simultaneously passing a second stream of gas upwardly through another vertical section of said enlarged vertical reaction zone at a velocity controlled to maintain said powder in a dense, turbulent state therein permitting continuous circulation of said powder freely back and forth laterally through substantially the entire length of both vertical sections of said reaction zone, separately collecting a stream of gas from the upper portion of said first-named vertical section from above the dense turbulent body of powder therein, withdrawing said collected gas from said reaction zone, separately collecting gas from the upper end of said second vertical section from above the dense turbulent body of powder therein, and withdrawing the last-named gas so collected from the reaction zone.

2. A process for carrying out gaseous reactions wherein a powder is caused to contact alternately separate and independent streams of gas which comprises passing one stream of gas upwardly through a vertical section of an enlarged reaction zone adapted to contain said powder at a velocity regulated to maintain said powder in a turbulent state, simultaneously passing a second stream of gas upwardly through a vertical section of said reaction zone spaced from said first-named section at a velocity regulated to maintain said powder in a tubulent state, simultaneously passing a third stream of relatively inert gas upwardly through a vertical section of said reaction zone between said first and second-named vertical sections whereby said last-named gaseous stream serves as a shield or blanket to prevent intermingling of the two first-named gaseous streams while permitting free circulation of the powder back and forth laterally between the first named and second named vertical sections, separately collecting gases from the upper end of said first-named vertical section and withdrawing them from the reaction zone, separately collecting gases from the upper end of said second-named section and withdrawing the same from the reaction zone.

3. A process for the conversion of hydrocarbons wherein the conversion is carried out in the presence of powdered catalyst which is reactivated by free circulation back and forth laterally between a conversion zone and a reactivating zone which comprises passing a stream of the hydrocarbons to be converted in vaporous form upwardly through one vertical section of an enlarged reaction zone containing a body of said powdered catalyst at a velocity regulated to maintain said catalyst in a turbulent state, simultaneously passing a reactivating gas upwardly through another vertical section of said enlarged reaction zone at a velocity controlled to maintain said catalyst in a turbulent state permitting continuous circulation of said catalyst freely back and forth laterally through substantially the entire length of both vertical sections so that said catalyst alternately contacts the hydrocarbons to be converted and said reactivating gas, separately collecting vaporous conversion products from the upper portion of said first-named vertical section and withdrawing the same from the reaction zone, separately collecting spent reactivating gas from the upper portion of the second vertical section and withdrawing the same from the reaction zone.

4. A process for the conversion of higher boiling hydrocarbons into high-quality aviation fuel which comprises passing said higher boiling hydrocarbons in vaporous state upwardly through one vertical section of an enlarged vertical reaction zone adapted to contain a body of powdered cracking catalyst maintained at cracking temperature at a velocity regulated to maintain said catalyst in a turbulent state, separately collecting vaporous conversion products in the upper portion of said vertical section, withdrawing the vaporous conversion products so collected, passing at least a portion of the vaporous conversion products removed from the upper portion of said first-named vertical section upwardly through a second vertical section of said enlarged reaction zone at a velocity regulated to maintain the catalyst in a turbulent state whereby said catalyst is caused to circulate freely back and forth laterally throughout the bottom portion of said reaction zone, separately collecting conversion products from the upper end of said second vertical section and withdrawing the same from the reaction zone.

5. An apparatus for effecting chemical reactions in gaseous state which comprises an enlarged vertical vessel forming an enclosed reaction zone, a conduit communicating with the bottom portion of said vessel for introducing a stream of gas into said vessel, means for distributing the gas so introduced over an outer annular section of said reaction vessel, a second conduit communicating with the bottom of said vessel for introducing a second stream of gas into said vessel, means for distributing said second stream of gas over the central section of said vessel, a depending annular baffle secured to the top of said vessel and having its lower end terminating within said vessel, a second annular baffle projecting upwardly from the bottom of said vessel and terminating below said first-named annular baffle to provide a free space between said baffles, said upwardly projecting baffle having openings at the bottom thereof providing free communication between opposite sides of said baffle in the lower portion of said vessel, and conduits at opposite sides of said depending baffle for withdrawing gases from said vessel.

6. An apparatus for effecting chemical reactions in gaseous state which comprises an enlarged vertical vessel forming an enclosed reaction zone, a conduit communicating with the bottom of said reaction zone for introducing a stream of gas to be reacted, means for distributing the gases so introduced over an outer annular portion of said reaction zone, a second conduit connected with the bottom portion of said vessel for introducing a second stream of gas, means for distributing said second stream of gas into the central section of said reaction zone, a vertical annular baffle supported in the bottom of said reaction zone and having its upper end terminating within said vessel, said baffle being spaced from said first-named distributing means and said second-named distributing means, means at the bottom of said baffle providing open communication between opposite sides thereof, a second annular baffle depending from the top of said vessel and terminating above said first-named annular baffle to provide a free space between said outer annular section and said central section, an annular conduit connected to the upper end of said first-named baffle, said conduit having perforations at the top thereof, means for introducing another stream of gas into said conduit, and means on opposite sides of said depending baffle for removing streams of gas from said vessel.

7. A process according to claim 4 wherein the conversion products passed through said second vertical section comprise naphtha which is catalytically retreated in said reaction zone.

8. A process according to claim 4 wherein the conversion products passed through said second vertical section comprise naphtha which is catalytically retreated in said reaction zone and the retreating step is carried out at about the same temperature as the catalytic conversion step in said reaction zone.

9. A process for carrying out gaseous reactions wherein a powder is alternately contacted with a plurality of gas streams which comprises passing one stream of gas upwardly through one vertical section of an enlarged vertical reaction zone containing a powder at a velocity regulated to maintain a relatively dense turbulent body of said powder in the bottom portion of said zone, simultaneously passing a second stream of gas upwardly through another vertical section of said enlarged vertical reaction zone at a velocity controlled to maintain said powder in a dense turbulent state therein permitting continuous circulation of said powder freely back and forth laterally throughout substantially the entire length of both vertical sections of said reaction zone and removing gases from the upper end of said reaction zone.

10. In a process for the conversion of hydrocarbons carried out in the presence of a finely divided solid catalyst which is maintained as a fluidized, turbulent bed, the improvement which comprises passing the hydrocarbon upwardly through one portion of said fluidized bed and passing a gas rich in free hydrogen upwardly through another and adjacent portion of said bed and permitting transfer of catalyst between said portions throughout substantially the entire depth of the bed without any substantial mixing of the hydrocarbon and hydrogen-containing gas.

11. In a process for carrying out gaseous reactions in the presence of a finely divided solid catalyst which is maintained as a fluidized, turbulent bed, the improvement which comprises passing a first gas stream upwardly through one portion of said fluidized bed and passing a second gas stream upwardly through another and adjacent portion of said bed and permitting transfer of catalyst between said portions throughout substantially the entire depth of the bed without any substantial mixing of the two gas streams.

JOHN C. MUNDAY.

REFERENCES CITED

The following references are of record in the file of this patent:

UNITED STATES PATENTS

| Number | Name | Date |
|---|---|---|
| 2,105,778 | Behr et al. | Jan. 18, 1938 |
| 2,330,545 | Benoit | Sept. 28, 1943 |
| 2,339,932 | Kuhl | Jan. 25, 1944 |
| 2,341,193 | Scheineman | Feb. 8, 1944 |
| 2,347,682 | Gunness | May 2, 1944 |
| 2,358,039 | Thomas et al. I | Sept. 12, 1944 |
| 2,358,888 | Thomas II | Sept. 26, 1944 |
| 2,367,694 | Snuggs | Jan. 23, 1945 |
| 2,378,342 | Voorhees et al. | June 12, 1945 |
| 2,385,326 | Bailey | Sept. 25, 1945 |
| 2,385,446 | Jewell et al. | Sept. 25, 1945 |
| 2,394,814 | Snuggs II | Feb. 12, 1946 |